Nov. 15, 1960  B. C. FRACKER  2,960,230
SHOVEL-TYPE HAND TOOL FOR SIFTING LIGHT MATERIAL
Filed Dec. 20, 1957
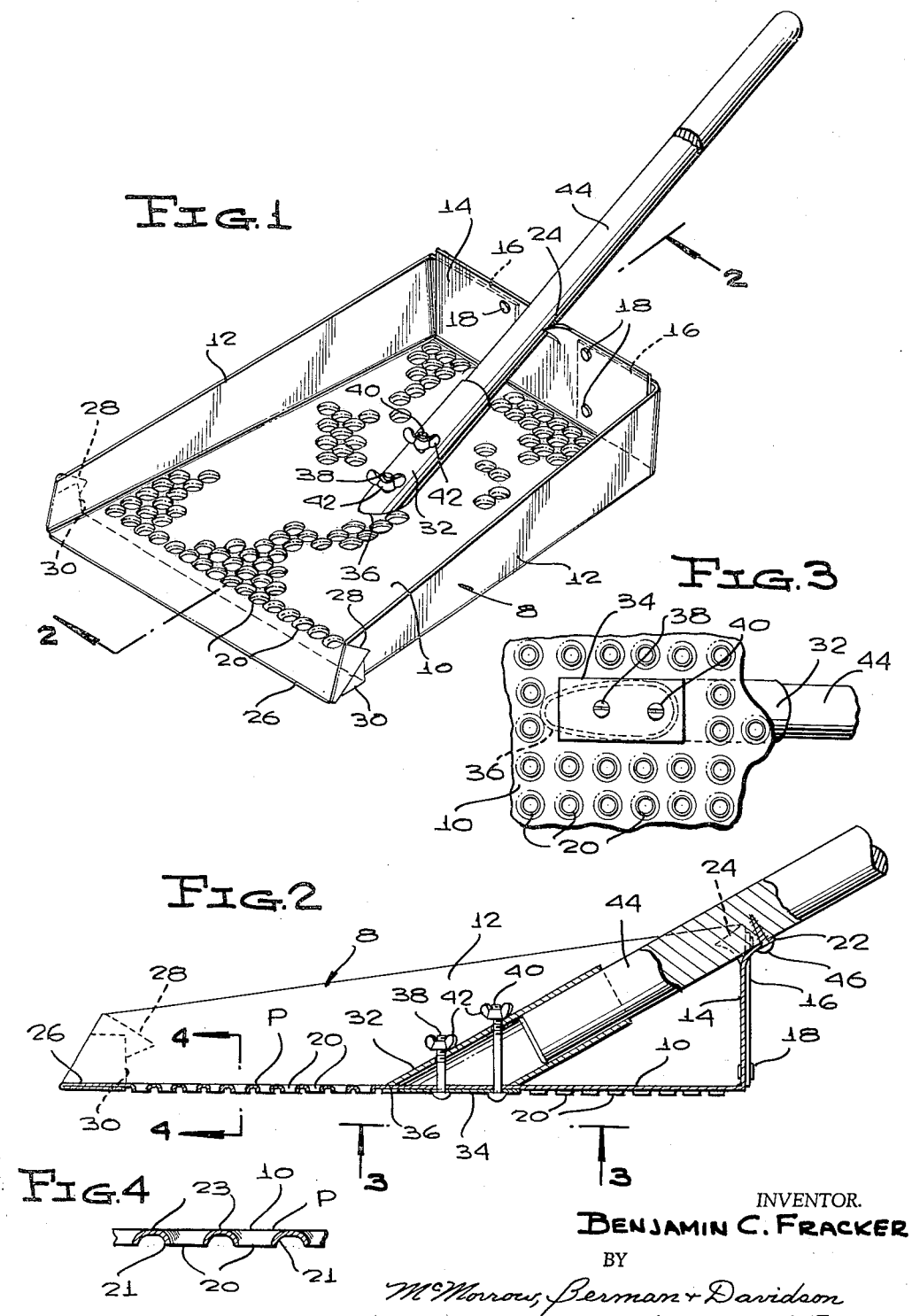
INVENTOR.
BENJAMIN C. FRACKER
BY
McMorrow, Berman + Davidson
ATTORNEYS

United States Patent Office 2,960,230
Patented Nov. 15, 1960

2,960,230

SHOVEL-TYPE HAND TOOL FOR SIFTING LIGHT MATERIAL

Benjamin C. Fracker, 3235 Oliver Road NE., Roanoke, Va.

Filed Dec. 20, 1957, Ser. No. 704,148

1 Claim. (Cl. 209—419)

This invention relates generally to hand tools, and more particularly has reference to a hand tool or implement having the general shape and characteristics of a shovel, in the sense of being provided with an elongated handle, and a forwardly opening scoop-like member at one end of the handle.

Heretofore, sifters generally have been designed as comparatively heavy devices, often having many parts which tend to become clogged with ashes or other material, in a manner that cuts down considerably upon the life of the device and upon the efficiency thereof.

Summarized briefly, the present invention is a hand tool having the general shape previously indicated herein, used for separating comminuted material from larger particles. The invention, thus, has its main adaptability, and is particularly intended for use, in the sifting of coal or wood ashes. To this end, the device has a material-supporting plate freely perforated over substantially its entire area. The walls of the perforations are so formed, and are so related to one another, that ridges are defined between adjacent holes, the number and form of which, taken in and of themselves or in combination with adjacent components of the device, produce exceptional strength in the tool, while providing a tool that is of appreciable lightness.

A further object is to provide a tool as stated which will be capable of manipulation with maximum ease, will be inexpensive in design, will have no relatively movable parts, will have a particularly strong lip at its forward, work-penetrating end, and will have a particularly novel and strong handle connection to the scoop portion of the tool or implement.

Another object is to provide a tool which, in relation to its relative lightness, will support substantially more material than is normally possible in devices used for the same purpose and having the same general size of the invention.

A further object is to provide a hole formation which will not only define ridges between adjacent holes, but further, will so form said ridges that no material of a finely divided nature will remain thereon, the ridges being sloped at all locations between the holes in a downward direction toward the holes, so that all material will tend to gravitate through the holes or perforations.

A further object is to so form the holes that they will have walls extending downwardly from the plane of the top surface of the plate element in which the holes are formed, whereby to eliminate to the maximum extent any possibility of clogging of the device, and to produce a particularly rapid sifting action.

Another object is to provide a device of the character stated which will be, in its entirety, a hand tool, rather than a floor-supported device of comparatively expensive and yet not particularly efficient action.

Still another object is to provide a particularly novel arrangement intended to permit the sifting member to be formed wholly of a single piece of sheet metal material, with exceptionally effective reinforcement being provided at the sides and back of the device, as well as across the front, due to the particular manner in which the sheet metal is cut and bent.

Other objects will appear from the following description, the claims appended thereto, and from the annexed drawing, in which like reference characters designate like parts throughout the several views, and wherein:

Figure 1 is a perspective view of a sifting implement according to the present invention, a portion of the handle being broken away;

Figure 2 is a longitudinal section on an enlarged scale, taken substantially on line 2—2 of Figure 1;

Figure 3 is a fragmentary bottom plan view showing the connection of the handle to the scoop; and, Figure 4 is an enlarged, detail sectional view substantially on line 4—4 of Figure 2.

Referring to the drawing in detail, designated generally at 8 is a shovel-shaped body including a flat sifter plate 10 of approximately rectangular outer configuration, it being understood of course, that said plate might be other than completely rectangular and can, for example, be gradually, progressively increased in transverse dimension in a direction from its back to its front end.

Plate 10 is freely perforated over substantially its entire area, with the perforations being arranged in intersecting longitudinal and transverse rows as clearly shown in Figure 3. The perforations are closely spaced, and are of a diameter which may be varied, but which in a preferred working embodiment is such as to permit finely divided material, such as the fines of coal ashes, to pass freely through the perforations, while larger particles such as small clinkers, unburned pieces of coal, etc., are prevented from passage through the openings.

In any event, the plate 10 is formed from a piece of sheet metal material, the piece being bent upwardly on opposite sides to provide side walls 12 extended fully from the back to the front end of the body and progressively reduced in height in a direction from said back to said front end, as clearly shown in Figures 1 and 2.

The piece of sheet metal is also bent to provide a back wall 14, and as will be noted from Figure 1, tongues 16 are integrally formed on the rear ends of the side walls, bent laterally inwardly toward each other to overlie the back surface of back wall 14. Rivets 18 or equivalent fastening elements extend through back wall 14 and through the tongues to fixedly connect the side walls to the back wall, while at the same time providing for a highly effective transverse bracing that adds to the overall strength of the back wall and counteracts any tendency of the side walls to spread under the weight of a supported load.

Designated at 20 are the perforations, and to provide said perforations, the plate 10 is subjected to the action of a multiple punch, hole forming die, or equivalent means. The punching action is carried out in such a way that each opening 20 is surrounded by a downwardly struck annulus 21. The annuli are progressively reduced in diameter in a direction toward the bottom edges thereof, and as will be noted, the side walls of said annuli are curvingly bowed inwardly, when viewed at any point on the circumference thereof. The side wall of each annulus merges smoothly into the side wall of the next adjacent annulus, that is, adjacent portions of adjacent side walls are in effect curved about a common radius, or substantially so, in a typical embodiment as shown in Figure 4.

The net result of this arrangement is that practically every bit of the area between openings has a downward slope toward an adjacent opening, and practically no areas are left between openings that are in a horizontal plane. Therefore, any finely divided materials supported upon the plate will tend immediately to gravitate through a perforation, while the larger particles are supported upon the tops of ridges 23 that are defined between adjacent openings, said ridges being of upwardly bowed cross-section and being curved through substantially 180 degrees due to the curvature of adjacent portions of adjacent side walls about a common center.

The crests of the ridges may be considered as the plane of the top surface of the sifter plate as will be noted from Figures 2 and 4. In other words, the crests of the upwardly bowed ridges are tangential to a plane P, with all portions of the side walls of the various annuli being lower than said plane.

Another important characteristic of the invention resides in the manner in which the single piece of sheet metal is cut and bent, to provide for attachment of a handle and to provide a transverse reinforcement at the front of the body 8. To this end, transversely spaced slits are formed in back wall 14 medially between opposite sides of the body, and the material between said slits defines a tongue 22 (see Figure 2) which is bent rearwardly. The material of the back wall disposed immediately adjacent to said tongue is bent forwardly as at 24, providing an abutment at each side of the handle limiting lateral displacement of the handle.

The front edge of the piece of sheet metal is folded upon itself as at 26, to provide a folded, imperforate lip that effectively reinforces the body at the leading edge thereof. The sheet metal, at the front ends of the side walls, is folded rearwardly as at 28, in overlying relation to upwardly folded end portions 30 of the bottom layer or lamination of lip 26. Spot welds or the like are applied, to effect a connection of the overlying parts to each other.

Designated at 32 is a sleeve or ferrule, having a beveled bottom edge cut away in a plane oblique to the length of the sleeve, so that the sleeve inclines rearwardly upwardly from the midportion of plate 10. Underlying the beveled lower end of the sleeve, and underlying also the plate 10, is a rectangular connecting plate 34, which underlies substantially the beveled lower end 36 of sleeve 32, as shown in Figure 3. Bolts 38, 40 of different lengths extend through registering openings formed in plate 10 and in plate 34. The heads of the bolts underlie plate 34, while the shanks project upwardly through longitudinally spaced openings formed in the top portion of the wall of sleeve 32. Wing nuts 42 are then applied to the bolts, to effect the fixed connection of the sleeve to the sifter plate. The connection is strongly braced by the plate 34.

An elongated handle 44 has a front end engaged in sleeve 32, and the handle is held against removal from the sleeve by reason of a lag screw 46 extending through tongue 22 and threadedly engaged in handle 44.

By reason of this arrangement, the device is effectively held in assembled relation, with the handle being secure within the sleeve 32. Abutments 24 of course prevent lateral displacement of the handle at the critical area immediately adjacent to the sleeve, so that the handle remains in full co-axial alignment with the sleeve.

Then, by extension of the screw 46 through the tongue defined between the abutments by the provision of the mentioned slits, the handle is held against longitudinal displacement, so as to be securely connected to the sifter plate.

The tool formed as illustrated and described has no moving parts, and is effectively braced, entirely by the particular manner in which a single piece of sheet metal material is bent and cut and the parts produced by the bending and cutting connected to each other. Further, the tool has the desirable characteristic that despite its relatively large capacity and its pronounced strength and ruggedness, it is quite light, so as to be easily handled. Still further, the tool is provided with a particularly novel, improved means of connecting the handle to the scoop body, and this means facilitating of assembly of the parts and replacement of a handle in the event one should become broken.

Another important characteristic of the invention resides in the particular shape of the annuli surrounding the openings 20 and the manner in which the openings are closely spaced over substantially the full area of the sifter plate. This produces an improved sifting action, designed to speed up measurably the entire process of sifting a quantity of ashes.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means for carrying out said principles, it being considered that the invention comprehends any minor change in construction that may be permitted within the scope of the appended claim.

What is claimed is:

A shovel body having a bottom plate having forward and rear edges, upstanding sidewalls formed on the side edges of the plate, said sidewalls having rear ends, and an upstanding back wall formed on the rear edge of the plate, said sidewalls having laterally inwardly extending flanges formed on their rear ends and engaged with the rear side of said back wall and secured thereto, said flanges having free edges which are spaced from each other along the back wall, said back wall having an upper edge, laterally spaced vertical slits formed in the back wall between the free ends of the flanges, said slits defining a tongue therebetween, said tongue being bent rearwardly from the back wall, material of the back wall located laterally outwardly of the slits being bent forwardly from the back wall to provide abutments, and a handle having a forward end secured to the bottom plate and having an intermediate portion disposed between and engaging said abutments and resting upon said tongue, and means securing the handle to said tongue.

References Cited in the file of this patent

UNITED STATES PATENTS

| | | |
|---|---|---|
| 283,086 | Edwards | Aug. 14, 1883 |
| 450,449 | Daly | Apr. 14, 1891 |
| 591,953 | Davenport et al. | Oct. 19, 1897 |
| 787,660 | Cahill | Apr. 18, 1905 |
| 996,621 | Danielson | July 4, 1911 |
| 1,026,265 | Hunnicutt | May 14, 1912 |
| 1,302,365 | Hays | Apr. 29, 1919 |
| 2,121,200 | Jonsson | June 21, 1938 |

FOREIGN PATENTS

| | | |
|---|---|---|
| 12,361 | France | June 14, 1910 |
| 90,461 | Germany | Feb. 3, 1897 |
| 413,134 | France | May 19, 1910 |